G. W. CHAMBERLAIN.
MEASURING APPARATUS.
APPLICATION FILED AUG. 13, 1908.
922,085.
Patented May 18, 1909.
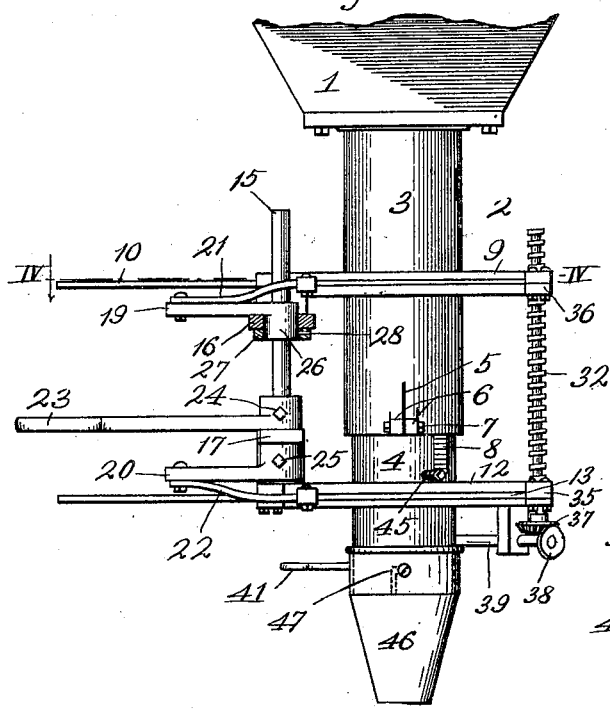
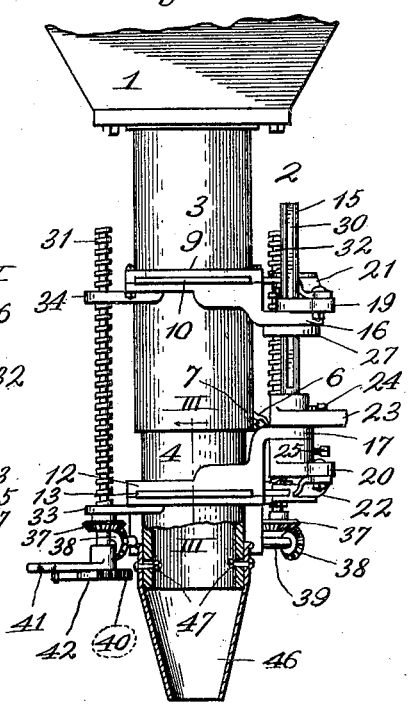
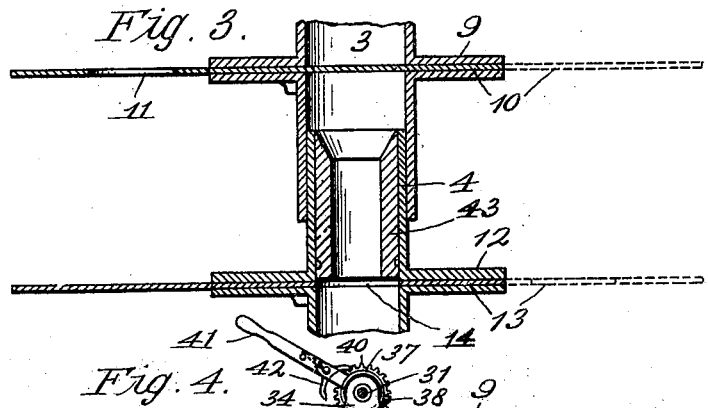
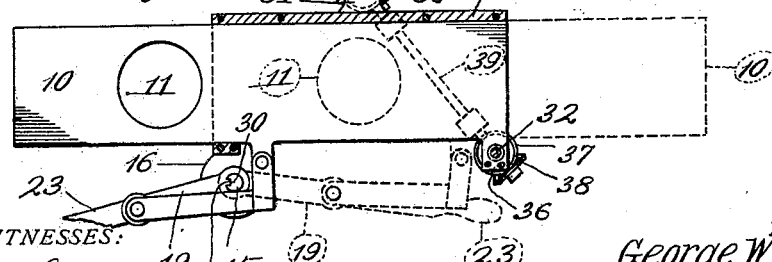
WITNESSES:
M. Cox.
R. E. Hamilton.
INVENTOR.
George W. Chamberlain,
BY
F. G. Fischer,
ATTORNEY.

UNITED STATES PATENT OFFICE.

GEORGE W. CHAMBERLAIN, OF KANSAS CITY, MISSOURI.

MEASURING APPARATUS.

No. 922,085.  Specification of Letters Patent.  Patented May 18, 1909.

Application filed August 13, 1908. Serial No. 448,407.

*To all whom it may concern:*

Be it known that I, GEORGE W. CHAMBERLAIN, a citizen of the United States, residing at Kansas City, in the county of Jackson and State of Missouri, have invented certain new and useful Improvements in Measuring Apparatus, of which the following is a specification.

My invention relates to a measuring apparatus, and my object is to provide a simple apparatus of this character whereby grain, meal, flour, beans, peas, or in fact anything that will flow readily through a spout may be quickly and accurately measured.

The invention is particularly useful to wholesale grocers, grain merchants, and others having a large number of sacks to fill with the same class of merchandise, as the merchandise may be measured as accurately and much more quickly with my apparatus than it can be with a scale.

Referring now to the accompanying drawing which illustrates the invention, Figures 1 and 2 represent front and side elevations respectively of the apparatus. Fig. 3 is a broken vertical section on line III—III of Fig. 2. Fig. 4 is a horizontal section on line IV—IV of Fig. 1.

1 designates a hopper or other suitable receptacle containing material to be measured.

2 designates a spout which may consist of one or more sections. In the drawing, I have shown it consisting of a stationary section 3, communicating with hopper 1, and an adjustable section 4 telescopically engaging section 3, so that the apparatus may be adjusted to measure different quantities of the material. The lower terminal of section 3 is split at 5 and provided with lugs 6 and a bolt 7, so that it may be drawn snugly around section 4, and thus prevent leakage of material between the sections. Section 4 is provided with a scale 8, so that it may be readily set to measure any desired quantity of material.

9 designates a housing formed integral with section 3, for the reception of a slide-valve 10, whereby the flow of material through section 3 is controlled. Valve 10 is provided with a port 11, which may be brought into coincidence with section 3 by sliding the valve to the right, as indicated by the dotted lines, Fig. 3.

Section 4 is provided with a housing 12, for the reception of a slide-valve 13, whereby the flow of material through section 4 is controlled, said valve being provided with a port 14, which may be brought into coincidence with the opening through section 4 by sliding the valve to the left, as shown by full lines, Fig. 3.

15 designates a vertical shaft mounted in bearings 16 and 17, extending forwardly from housings 9 and 12 respectively. Said shaft is provided with crank-arms 19 and 20, connected respectively to valves 10 and 13 by two links 21 and 22, forming toggles for actuating the valves. Shaft 15 may be actuated either by power or through the instrumentality of a hand lever 23 fixed to the lower portion thereof by a set-screw 24. Crank-arm 20 is also fixed to the lower portion of shaft 15 by a set screw 25, while crank-arm 19 loosely engages said shaft, so the same may slide longitudinally therethrough when section 4 is adjusted upwardly or downwardly. Crank-arm 19 is prevented from moving up or down with shaft 15 by an integral hub 26, extending through bearing 16, and provided at its lower end with a collar 27 secured thereto by a pin 28. Hub 26 is provided with a feather 29 which enters a longitudinal groove 30 in shaft 15, so the latter may slide through the hub and be turned thereby. With this arrangement, it is obvious that when lever 23 is thrown to the left it will through the instrumentality of shaft 15, crank-arms 19 and 20 and links 21 and 22, slide the valves to the left and thereby close section 3 and open section 4, so that the material which is measured by the space between the valves may be discharged from section 4.

Section 4 is adjusted upward or downward to diminish or increase each charge of material by two vertically arranged screws 31 and 32, the former of which is journaled at its lower end in a bearing 33, projecting rearwardly from housing 12, while its upper portion is threaded in a bearing 34, extending rearwardly from housing 9. Screw 32 is journaled at its lower end in a bearing 35 projecting forwardly from housing 12, and is threaded in a bearing 36 extending forwardly from housing 9. The screws are simultaneously adjusted by bevel gear wheels 37 fixed to their lower portions, bevel gear wheels 38 intermeshing with bevel gear wheels 37 and fixed to a horizontal shaft 39, a ratchet wheel 40 fixed to the lower terminal of screw 31, and a hand lever 41, loosely mounted on the lower portion of screw 31 and provided with a double acting pawl 42, either end of which is adapted to engage the ratchet wheel 40, so that screws 31 and 32 may be rotated in either direction.

43 designates a bushing removably secured in section 4 by a set screw 45, so that the capacity of section 4 may be reduced to a minimum.

46 designates a downwardly tapering hood for directing the discharging material into sacks when desired; said hood is removably connected with the lower terminal of section 4 by two oppositely disposed bayonet joints 47.

From the above description it is obvious that I have produced a measuring apparatus, which is simple in construction, accurate in measuring material and easy to manipulate.

Having thus described my invention, what I claim and desire to secure by Letters Patent is:

An apparatus of the character described, consisting of a spout having two sections, one of which is telescopically connected to the other, means for adjusting said telescopic section in or out, a valve coöperating with each section of the spout, for measuring and controlling the flow of material therethrough, a journaled shaft adjacent the spout, and toggles connecting the valves and said shaft, one of said toggles being adjustable on the shaft, so that it may be moved with the telescopic section of the spout.

In testimony whereof I affix my signature, in the presence of two witnesses.

GEORGE W. CHAMBERLAIN.

Witnesses:
F. G. FISCHER,
M. COX.